(12) United States Patent
Wang et al.

(10) Patent No.: US 10,437,140 B2
(45) Date of Patent: *Oct. 8, 2019

(54) PROJECTION DEVICE WITH CAMERA MODULE

(71) Applicant: Compal Electronics, Inc., Taipei (TW)

(72) Inventors: Wei-Jun Wang, Taipei (TW); Wen-Yi Chiu, Taipei (TW); Ting-Wei Wu, Taipei (TW); Chia-Min Liao, Taipei (TW); Tse-Hsun Pang, Taipei (TW); Kun-Hsuan Chang, Taipei (TW); Yu-Hao Tseng, Taipei (TW); Jui-Tsen Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 220 days.

This patent is subject to a terminal disclaimer.

(21) Appl. No.: 15/595,965

(22) Filed: May 16, 2017

(65) Prior Publication Data

US 2017/0347078 A1 Nov. 30, 2017

Related U.S. Application Data

(60) Provisional application No. 62/370,682, filed on Aug. 3, 2016, provisional application No. 62/361,477, filed
(Continued)

(51) Int. Cl.
*G03B 21/20* (2006.01)
*G06K 9/20* (2006.01)
(Continued)

(52) U.S. Cl.
CPC ....... *G03B 21/2046* (2013.01); *G03B 21/142* (2013.01); *G03B 21/2053* (2013.01);
(Continued)

(58) Field of Classification Search
CPC .............. G03B 21/2046; G03B 21/142; G03B 21/2053; G06T 11/60; H04N 5/2256;
(Continued)

(56) References Cited

U.S. PATENT DOCUMENTS

| 2002/0021287 A1* | 2/2002 | Tomasi | G06F 1/1613 345/168 |
| 2007/0025612 A1* | 2/2007 | Iwasaki | G01B 11/25 382/154 |

(Continued)

FOREIGN PATENT DOCUMENTS

| CN | 104656890 | 5/2015 |
| TW | 201326670 | 7/2013 |

*Primary Examiner* — Marnie A Matt (57) ABSTRACT

A projection device includes a projection module and a first camera module. The projection device has a first optical axis and configured to form a projection area, wherein a projection of the first optical axis on an X-Z plane of the projection device is perpendicular to an X-Y plane on which the projection area is formed. The first camera module is disposed on a side of the projection module and includes a second optical axis, wherein the first camera module is configured to form a first shooting area, the second optical axis forms a first angle $\Delta\theta1$ with respect to the first optical axis, the projection area at least partially overlaps the first shooting area to form an overlapping area, and the first angle $\Delta\theta1$ is a function of a distance between the projection module and the first camera module.

18 Claims, 11 Drawing Sheets

Related U.S. Application Data on Jul. 12, 2016, provisional application No. 62/361,470, filed on Jul. 12, 2016, provisional application No. 62/341,053, filed on May 24, 2016.

(51) Int. Cl.

| | |
|---|---|
| H04N 5/225 | (2006.01) |
| H04N 5/232 | (2006.01) |
| H04N 5/235 | (2006.01) |
| H04N 5/262 | (2006.01) |
| H04N 9/31 | (2006.01) |
| G03B 21/14 | (2006.01) |
| H04N 5/247 | (2006.01) |
| H04N 5/33 | (2006.01) |
| G06F 3/0484 | (2013.01) |
| G06F 3/0486 | (2013.01) |
| G06F 3/0488 | (2013.01) |
| G06F 3/16 | (2006.01) |
| G06T 11/60 | (2006.01) |
| G06F 3/01 | (2006.01) |
| H04N 9/07 | (2006.01) |
| G06F 3/0481 | (2013.01) |
| G06K 9/00 | (2006.01) |
| G06F 3/042 | (2006.01) |
| G06F 16/58 | (2019.01) |
| G06F 3/043 | (2006.01) |
| G06F 3/044 | (2006.01) |
| G06F 3/045 | (2006.01) |
| G06K 7/14 | (2006.01) |

(52) U.S. Cl.
CPC ............ *G06F 3/017* (2013.01); *G06F 3/0425* (2013.01); *G06F 3/0484* (2013.01); *G06F 3/0486* (2013.01); *G06F 3/04817* (2013.01); *G06F 3/04842* (2013.01); *G06F 3/04883* (2013.01); *G06F 3/167* (2013.01); *G06K 9/00* (2013.01); *G06K 9/2081* (2013.01); *G06T 11/60* (2013.01); *H04N 5/2256* (2013.01); *H04N 5/2258* (2013.01); *H04N 5/2351* (2013.01); *H04N 5/2352* (2013.01); *H04N 5/2354* (2013.01); *H04N 5/23216* (2013.01); *H04N 5/23296* (2013.01); *H04N 5/247* (2013.01); *H04N 5/2628* (2013.01); *H04N 5/33* (2013.01); *H04N 9/07* (2013.01); *H04N 9/315* (2013.01); *H04N 9/3155* (2013.01); *H04N 9/3179* (2013.01); *H04N 9/3194* (2013.01); *G06F 3/043* (2013.01); *G06F 3/044* (2013.01); *G06F 3/045* (2013.01); *G06F 3/0421* (2013.01); *G06F 16/58* (2019.01); *G06K 7/1417* (2013.01)

(58) Field of Classification Search
CPC .............. H04N 5/2258; H04N 5/2352; H04N 5/23296; H04N 5/2351; H04N 9/315; H04N 5/33; H04N 5/247; H04N 9/3155; H04N 5/2354; H04N 5/23216; H04N 5/2628; H04N 9/3179; H04N 9/3194; H04N 9/07; G06K 9/2081; G06K 7/1417; G06F 3/167; G06F 16/58; G06F 3/045; G06F 3/044; G06F 3/043; G06F 3/0421; G06F 3/04817; G06F 3/0484; G06F 3/017; G06F 3/04842; G06F 3/0486; G06F 3/04883; G06F 3/0425
USPC .......................................................... 348/164
See application file for complete search history.

(56) References Cited

U.S. PATENT DOCUMENTS

| | | | |
|---|---|---|---|
| 2013/0241820 A1* | 9/2013 | Keh ...................... | G06F 3/1454 345/156 |
| 2013/0271573 A1* | 10/2013 | Steinbichler ......... | H04N 13/204 348/46 |
| 2014/0046184 A1* | 2/2014 | Heinrich .............. | A61B 5/0064 600/438 |
| 2014/0139717 A1* | 5/2014 | Short .................... | H04N 7/142 348/333.1 |
| 2014/0184751 A1* | 7/2014 | Liou .................... | H04N 13/239 348/47 |
| 2016/0103497 A1* | 4/2016 | Yamaguchi ............ | G02B 7/182 345/156 |

* cited by examiner

PROJECTION DEVICE WITH CAMERA MODULE

FIELD OF THE INVENTION

The present invention relates to a projection device, and more particularly to a projection device with functions of operation-detection.

BACKGROUND OF THE INVENTION

With the development of technologies in the projector industry, the size of projection modules has been significantly reduced. Thus, in recent years, projection modules have been gradually integrated into other electronic products, such as interactive electronic products.

In various interactive electronic products, for example, a projector has a camera capable of detecting infrared light, and uses an infrared light emitting module to generate an infrared curtain over the display surface. When the infrared curtain is blocked by an object (e.g., a user's finger), reflection spots of infrared light are generated. The reflection spots on the display screen can be captured by the camera capable of detecting infrared light, and control instructions are performed according to the positions of the reflection spots to enable the projector to project various images. In addition, a color camera can also be used to capture and recognize a user's gesture so as to control the projector to project different images.

As seen from the above, how to improve the detection ability and controllability of an interactive projector has been the focus among the persons skilled in the technical field.

SUMMARY OF THE INVENTION

An objective of the present invention is to provide a projection device with improved detection and operation performances.

Other objectives and advantages of the present invention can be further understood by the technical features disclosed by the invention.

To achieve the objectives, an embodiment of a projection device of the invention includes a projection module and a first camera module. The projection device has a first optical axis and configured to form a projection area, wherein a projection of the first optical axis on an X-Z plane of the projection device is perpendicular to an X-Y plane on which the projection area is formed. The first camera module is disposed on a side of the projection module and includes a second optical axis, wherein the first camera module is configured to form a first shooting area, the second optical axis forms a first angle $\Delta\theta 1$ with respect to the first optical axis. The projection area at least partially overlaps the first shooting area to form an overlapping area, and the first angle $\Delta\theta 1$ is a function of the distance between the projection module and the first camera module.

In another embodiment, the projection module projects an image to a bearing surface bearing the projection device to form the projection area. The projection device further includes a base on the bearing surface; the projection module and the first camera module are on aside of the base. The bearing surface has a first distance Z1 to the projection module and a second distance Z2 to the first camera module. A first gap D1 is formed between the projection module and the first camera module. The first camera module shoots towards the bearing surface to form the first shooting area on the bearing surface when $\Delta\theta 1=0$. The first shooting area is quadrilateral and includes two long sides and two wide sides, and a length of the long side near the base is 2X.

In another embodiment, the projection device further includes a reference plane. The projection module and the first camera module are disposed on the reference plane.

In another embodiment, the projection device further includes a baseline perpendicular to the reference plane. The first optical axis of the projection module is parallel to the baseline, and the second optical axis of the first camera module forms the first angle $\Delta\theta 1$ with respect to the baseline.

In another embodiment, a value of the first angle $\Delta\theta 1$ is the function of the distance between the projection module and the first camera module, and $\Delta\theta 1 = f(D1) = \arctan((D1+X)/Z2) - \arctan(X/Z2)$ when the projection area of the projection module is entirely included in the first shooting area.

In another embodiment, the first camera module is a color camera module.

In another embodiment, the projection device further includes a light emitting module configured to form a sensing area. The first camera module shoots movements of a user occurring in the sensing area, and the first shooting area covers the sensing area.

In another embodiment, the first camera module is an infrared camera module and the light emitting module is an infrared emitting module.

In another embodiment, the projection device further comprising a light emitting module configured to form a sensing area, wherein the first camera module shoots movements of a user occurring in the sensing area, and the first shooting area covers the sensing area.

In another embodiment, the first camera module is an infrared camera module, and the light emitting module is an infrared emitting module.

In another embodiment, the projection device further includes a processing module electrically connected to the projection module and the first camera module. The processing module is configured to enable the projection module and the first camera module.

In another embodiment, the projection device further includes a camera driving module electrically connected to the processing module. The processing module enables the camera driving module to drive the first camera module to rotate to a specific angle on a Y-Z plane when the projection module rotates to the specific angle on the Y-Z plane.

In another embodiment, the camera driving module includes at least one servo motor and a gear set.

In another embodiment, the projection device further includes a second camera module and a light emitting module. The second camera module is disposed between the projection module and the first camera module, wherein the second camera module includes a third optical axis and is configured to form a second shooting area, the third optical axis forms a second angle $\Delta\theta 2$ with respect to the first optical axis, and the second shooting area. The first shooting area and the projection area at least partially overlap one another to form the overlapping area. The light emitting module is configured to form a sensing area, wherein the second camera module is configured to shoot movements of a user occurring in the sensing area, and the second shooting area covers the sensing area.

In another embodiment, the projection module projects an image to a bearing surface bearing the projection device to form the projection area. The projection device further includes a base on the bearing surface; the projection module and the first camera module are on aside of the base.

The bearing surface has a first distance Z1 to the projection module, a second distance Z2 to the first camera module. The second camera module has a third distance Z3 to the bearing surface. A first gap D1 is formed between the projection module and the first camera module, a second gap D2 is formed between the projection module and the second camera module. The second camera module shoots towards the bearing surface to form the second shooting area on the bearing surface when the second angle $\Delta\theta 2=0$. The second shooting area is quadrilateral and includes two long sides and two wide sides; and a length of the long side near the base is 2X1.

In another embodiment, the projection device further includes a reference plane. The projection module, the first camera module and the second camera module are disposed on the reference plane.

In another embodiment, the projection device further includes a baseline perpendicular to the reference plane. The second optical axis of the first camera module forms the first angle $\Delta\theta 1$ with respect to the baseline, the third optical axis of the second camera module forms the second angle $\Delta\theta 2$ with respect to the baseline, and the first optical axis of the projection module forms a third angle $\Delta\theta 3$ with respect to the baseline. When the projection area of the projection module is entirely included in the first shooting area, a value of the first angle $\Delta\theta 1 f(D1)=\arctan((D1+X)/Z2)-\arctan(X/Z2)$. When the projection area of the projection module is entirely included in the second shooting area, a value of the second angle $\Delta\theta 2=f(D2)=\arctan((D2+X1)/Z3)-\arctan(X1/Z3)$. The third angle falls within the range of 0 to 30 degrees.

In another embodiment, the first camera module is a color camera module, the second camera module is an infrared camera module, and the light emitting module is an infrared emitting module.

In another embodiment, a projection device includes a projection module and a first camera module. The projection module includes a first optical axis and configured to form a projection area. The first camera module is disposed on a first side of the projection module and including a second optical axis. The first camera module and the projection module are disposed on a reference plane, and the first optical axis and the second optical axis are perpendicular to the reference plane. The first camera module is configured to form a first shooting area, and the projection area at least partially overlaps the first shooting area to form an overlapping area.

In another embodiment, the projection device further includes a second camera module and a light emitting module. The second camera module is disposed on a second side opposite to the first side of the projection module and on the reference plane. The second camera module includes a third optical axis and is configured to form a second shooting area. The third optical axis is perpendicular to the reference plane. The projection area, the first shooting area and the second shooting area at least partially overlap one another to form the overlapping area. The light emitting module is configured to form a sensing area. The second camera module is configured to shoot movements of a user occurring in the sensing area, and the second shooting area covers the sensing area.

In another embodiment, the first camera module is connected to the first side of the projection module, and the second camera module is connected to the second side of the projection module.

In another embodiment, the first camera module is a color camera module, the second camera module is an infrared camera module, and the light emitting module is an infrared emitting module.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
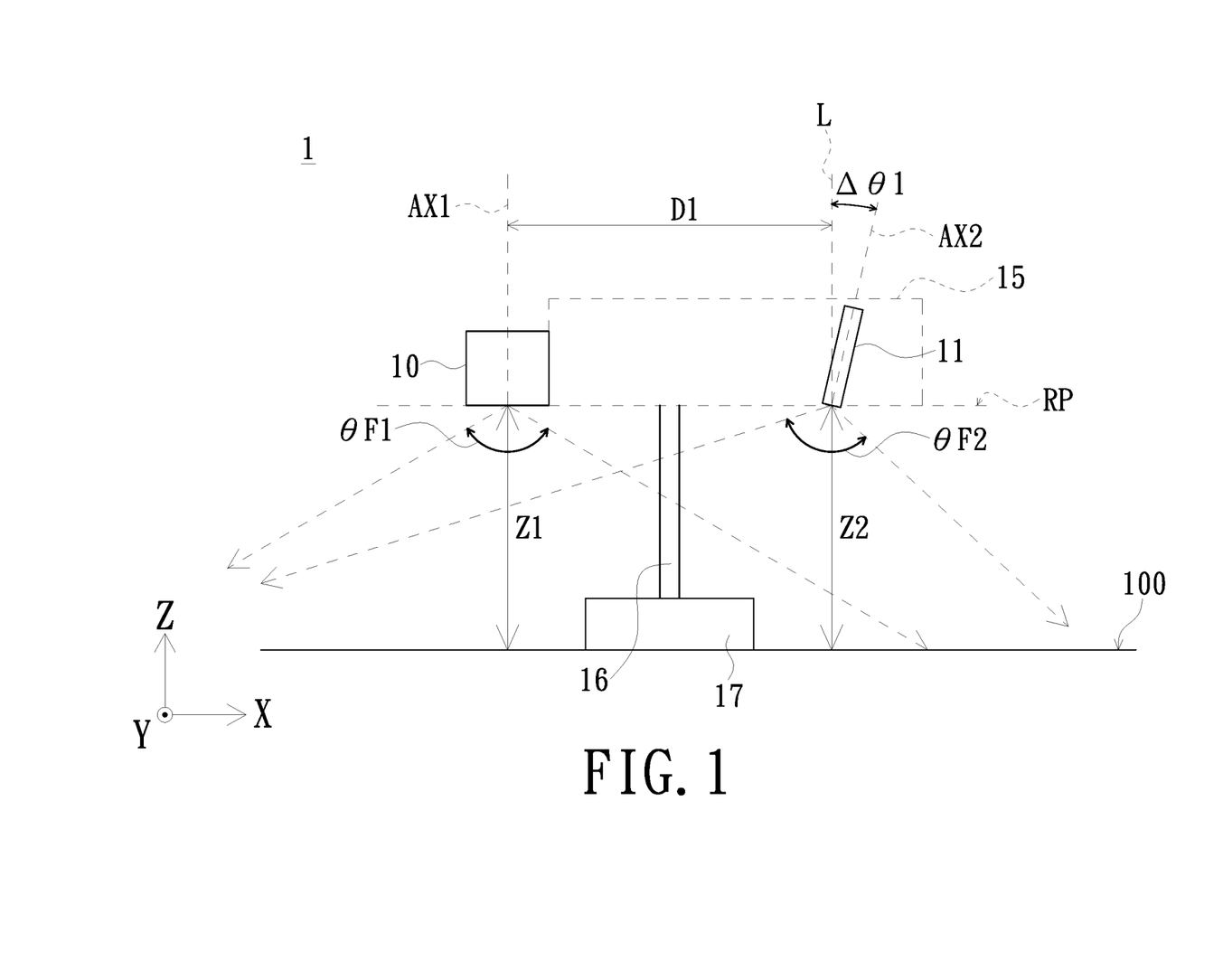
FIG. 1 is a schematic diagram of an embodiment of a projection device of the present invention.
Figure 2:
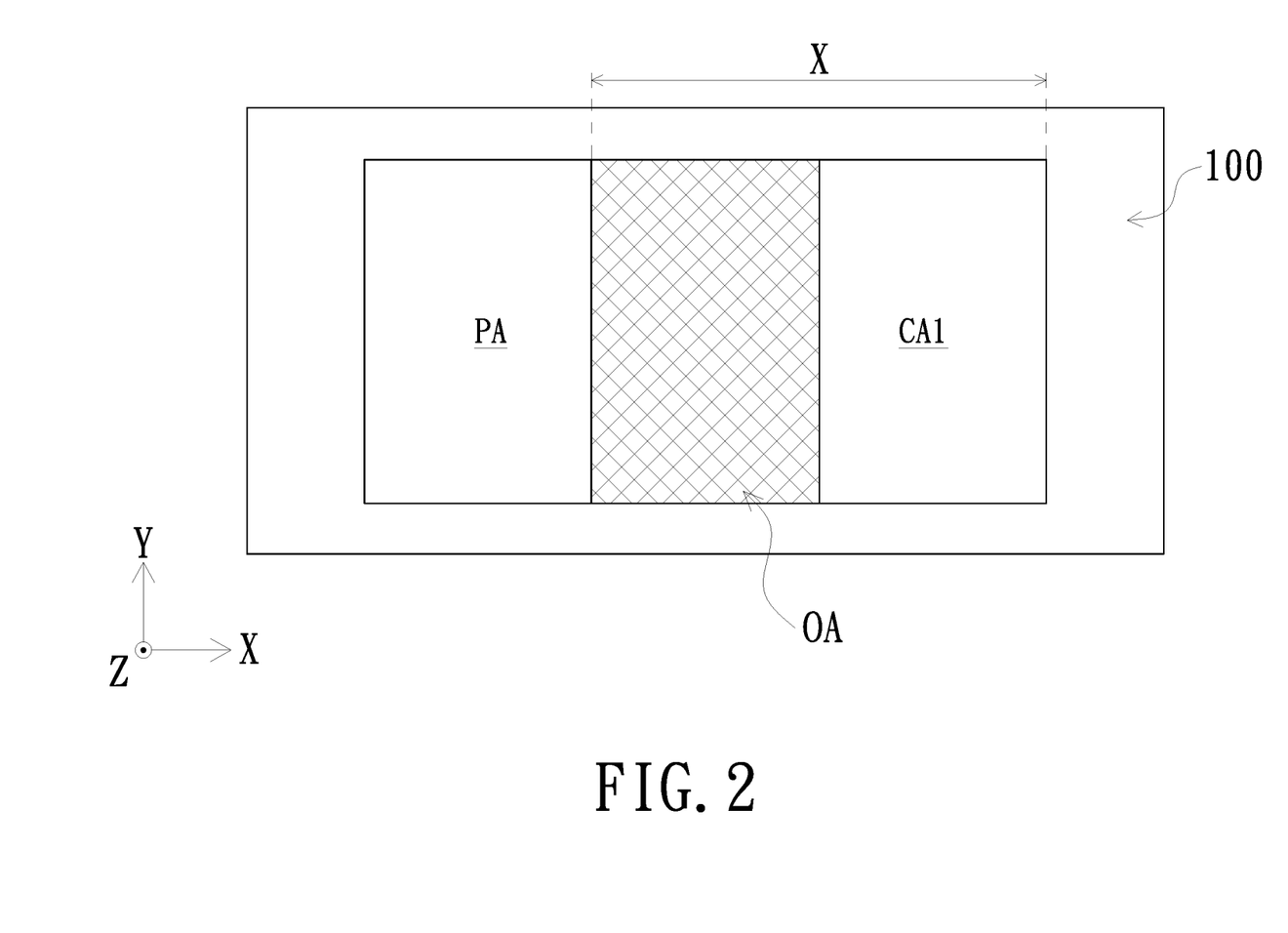
FIG. 2 is a schematic diagram of a projection area of a projection module and a shooting area of the first camera module of the projection device of FIG. 1.

Referring to FIGS. 1 and 2. FIG. 1 is a schematic diagram of an embodiment of a projection device of the present invention, and FIG. 2 is a schematic diagram of a projection area of a projection module and a shooting area of the first camera module of the projection device of FIG. 1. The projection device 10 of this embodiment includes a projection module 10 and a first camera module 11. The projection module 10 includes a first optical axis AX1, and the projection module 10 is configured to form a projection area PA. The projection module 10 projects an image to a bearing surface 100 bearing the projection device 1 to form the projection area PA. A projection of the first optical axis AX1 on a projection plane formed by an X-axis and a Z-axis is perpendicular to the projection area PA which is on a plane formed by the X axis and a Y axis. The first camera module 11 is disposed on a side of the projection module 10 and has a second optical axis AX2. The first camera module 11 is configured to form a first shooting area CA1 on the bearing surface 100. In this embodiment, the first camera module 11 is a color camera module, but the invention is not limited thereto. The color camera module captures a user's gestures or operational movements to a mouse or a keyboard in the first shooting area CA1 so that the projection module 10 is controlled to project different images. In this embodiment, the second optical axis AX2 forms a first angle 401 with respect to the first optical axis AX1. The projection area PA of the projection module 10 at least partially overlaps the first shooting area CA1 of the first camera module 11 to form an overlapping area OA. The first angle 401 between the first optical axis AX1 and the second optical axis AX2 is a function of a distance (a first gap D1) between the projection module 10 and the first camera module 11.

Other detailed structures of the projection device 1 of the embodiment are described as follows.

As shown in FIGS. 1 and 2, the projection module 10 and the first camera module 11 are disposed over the bearing surface 100. The first camera module 11 is disposed in the housing 15, and the projection module 10 is disposed on a side of the housing 15. The housing 15 is connected to a base 17 through a frame 16, and the base 17 is disposed on the bearing surface 100. The projection module 10 and the first camera module 11 are disposed above the base 17. In this embodiment, the bearing surface 100 has a first distance Z1 to the projection module 10 and a second distance Z2 to the first camera module 11. The first distance Z1 and the second distance Z2 range from 350 mm to 450 mm. In this embodiment, the projection module 10 and the first camera module 11 are disposed on the same reference plane RP. The reference plane RP is parallel to the bearing surface 100. That is a height (the first distance Z1) of the projection module 10 with respect to the bearing surface 100 is equal to a height (the second distance Z2) of the first camera module 11 with respect to the bearing surface 100. However, the invention is not limited thereto. In another embodiment, the first distance Z1 is not equal to the second distance Z2. In addition, the first gap D1 is formed between the first optical axis AX1 of the projection module 10 and the projection module 10 and the second optical axis AX2 of the first camera module 11. In this embodiment, the first gap D1 ranges from 160 mm to 170 mm, but the invention is not limited thereto. In another embodiment, the first shooting area CA1 formed on the bearing surface 100 by the first camera module 11 is quadrilateral which has a long side X near the first shooting area CA1.

As shown in FIGS. 1 and 2, the projection device 1 of this embodiment, further includes a baseline L perpendicular to the reference plane RP. In this embodiment, the first optical axis AX1 of the projection module 10 is parallel to the baseline L. The second optical axis AX2 has the first angle $\Delta\theta1$ with respect to the baseline L. The first angle $\Delta\theta1$ ranges from 3 degree to 5 degree. That is the projection direction of the projection module 10 is maintained, but the shooting direction of the first camera module 11 is shifted for 3 degree to 5 degree with respect to the projection direction of the projection module 10 to allow the projection area PA at least partially overlaps the a first shooting area CA1 of the first camera module 11 to form the overlapping area OA. In addition, the projection module 10 has a view angle $\theta F1$ ranging from 60 degree to 70 degree. The first camera module 11 has a view angle $\theta F2$ ranging from 60 degree to 75 degree.

Particularly, since the first optical axis AX1 of the projection module 10 is parallel to the baseline L, the first angle $\Delta\theta1$ is the angle between the second optical axis AX2 of the first camera module 11 and the first optical axis AX1 of the projection module 10. In this embodiment, the first angle $\Delta\theta1$ is a function of the distance (the first gap D1) between the projection module 10 and the first camera module 11. When the projection area PA of the projection module 10 is entirely included in the first shooting area CA1 of the first camera module 11, $$\Delta\theta1=f(D1)=\arctan((D1+X)/Z2)-\arctan(X/Z2).$$

Figure 3:
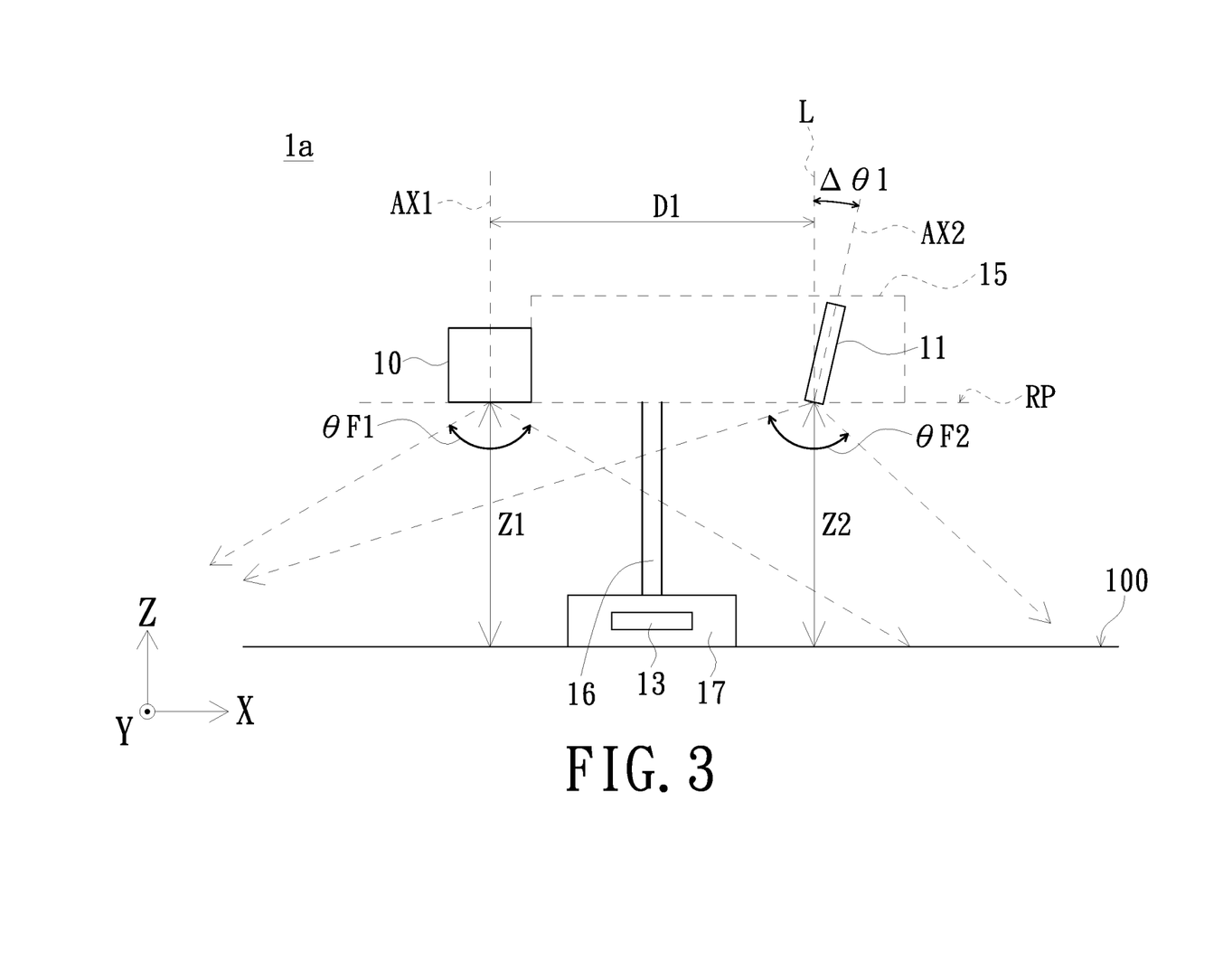
FIG. 3 is a schematic diagram of another embodiment of a projection device of the present invention.

Referring to FIG. 3. FIG. 3 is a schematic diagram of another embodiment of a projection device of the present invention. As shown in FIG. 3, the projection device 1a is similar to the projection device 1 of FIG. 1. However, the projection device 1a of this embodiment further includes a light emitting module 13. In this embodiment, the light emitting module 13 is an infrared emitting module, and the first camera module 11 is an infrared camera module. The light emitting module 13 is configured to form a sensing area above the bearing surface 100 (not shown in FIG. 3). For example, the sensing area is an infrared curtain. The first shooting area of the first camera module 11 (similar to the first shooting area CA1 of FIG. 2) includes the sensing area and a user's operational movements are captured in the sensing area. When the user's fingers enter the sensing area and reflect light to generate reflected light spot (such as a reflected infrared spot), and the first camera module 11 captures an image including the reflected light spot. The position of the reflected light spot is identified to perform corresponding operational commands to enable the projection module 10 to project different images. As other structures of the projection device 1a are similar to that of the projection device 1 of FIG. 1, the description is thus omitted here. In addition, the projection area of the projection module 10, the first shooting area of the first camera module 11 and the overlapping area formed by the projection area at least partially overlapping the first shooting area are similar to that of FIG. 2, and the description for them is thus omitted.

Figure 4:
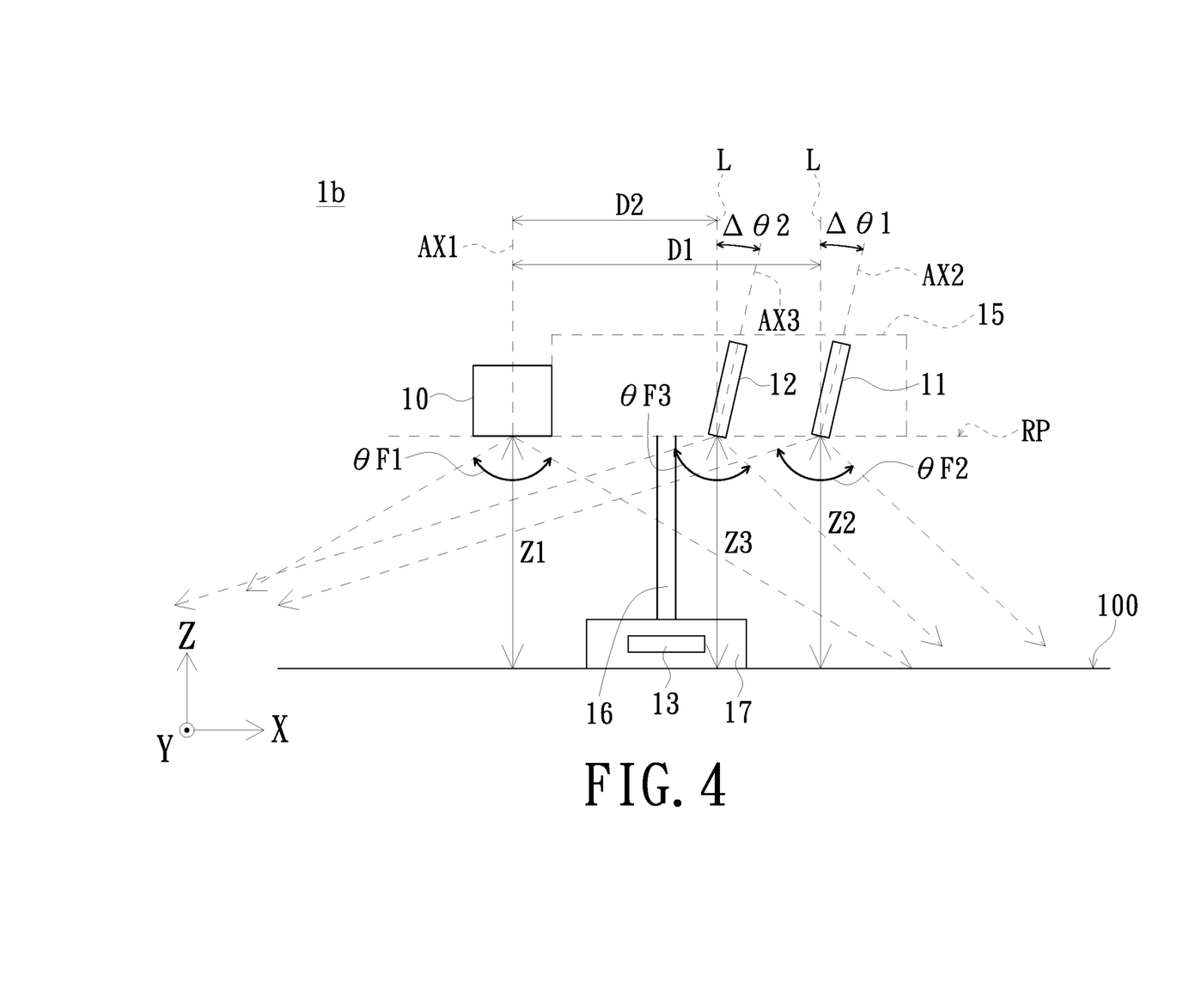
FIG. 4 is a schematic diagram of another embodiment of a projection device of the present invention.
Figure 5:
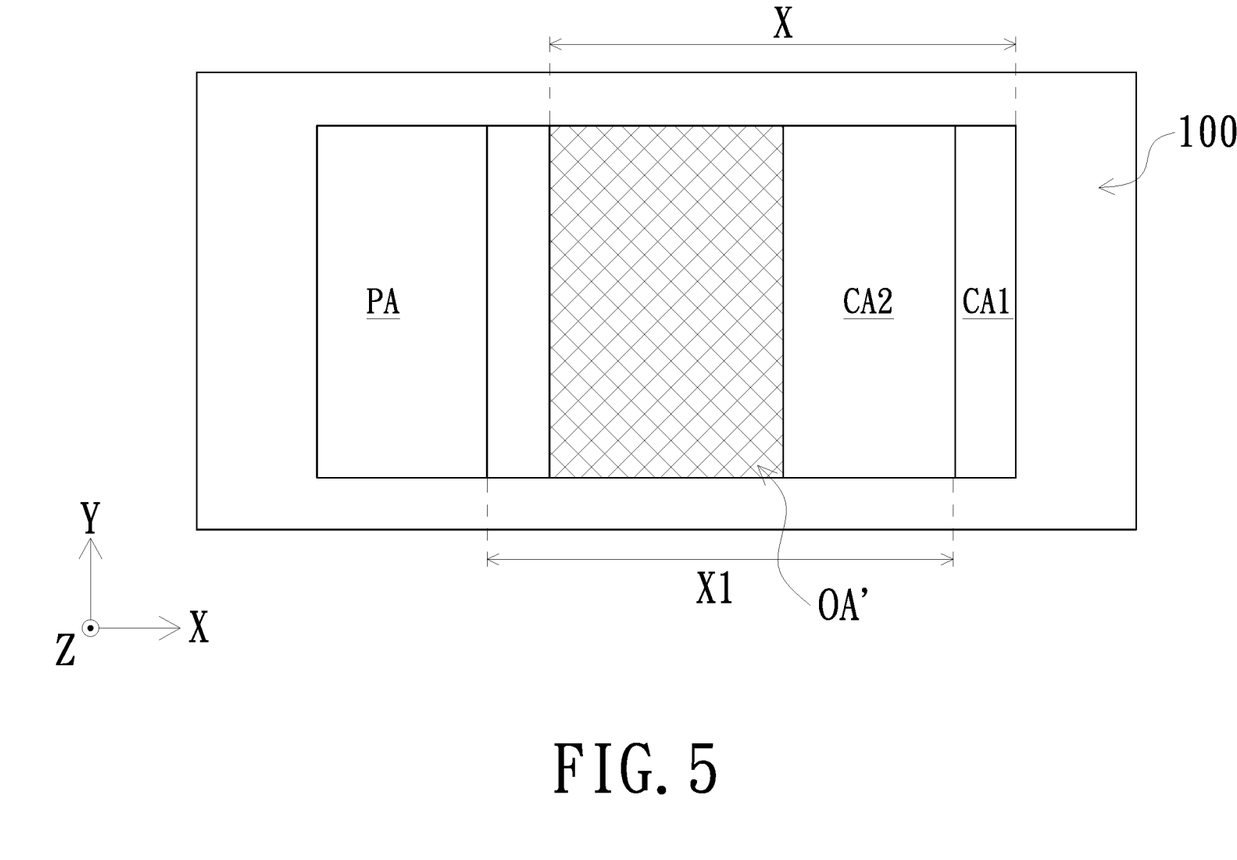
FIG. 5 is a schematic diagram of a projection area of a projection module, a shooting area of the first camera module and a shooting area of the second camera module of the projection device of FIG. 4.

Referring to FIGS. 4 and 5. FIG. 4 is a schematic diagram of another embodiment of a projection device of the present invention, and FIG. 5 is a schematic diagram of a projection area of a projection module, a shooting area of the first camera module and a shooting area of the second camera module of the projection device of FIG. 4. As shown in FIGS. 4 and 5, the projection device 1b is similar to the projection device 1 of FIG. 1. However, the projection device 1b of this embodiment further includes a second camera module 12 and a light emitting module 13. The second camera module 12 is disposed between the projection module 10 and the first camera module 11. The second camera module 12 has a third optical axis AX3 to form a second shooting area CA2. The light emitting module 13 is configured to form a sensing area (not shown in FIGS. 4 and 5). For example, the sensing area is an infrared curtain. The second shooting area CA2 of the second camera module 12 includes the sensing area and a user's operational movements are captured in the sensing area. In this embodiment, for example, the first camera module 11 is a color camera module, the second camera module 12 is an infrared camera module and light emitting module 13 is an infrared emitting module. However, the invention is not limited thereto. The projection device 1b is operated by gestures captured by the color camera module or touch-controlled by movements captured by the infrared camera module and the infrared emitting module. In this embodiment, the second optical axis AX2 of the first camera module 11 has the first angle Δθ1 with respect to the first optical axis AX1 of the projection module 10, and the third optical axis AX3 of the second camera module 12 has the second angle Δθ2 with respect to the first optical axis AX1 of the projection module 10. The projection area PA of the projection module 10, the first shooting area CA1 of the first camera module 11 and the second shooting area CA2 of the second camera module 12 at least partially overlap one another to form an overlapping area OA'.

Referring to FIGS. 4 and 5. The projection module 10, the first camera module 11 and the second camera module 12 are disposed above the bearing surface 100 of the projection device 1. The first camera module 11 and the second camera module 12 are disposed within the housing 15, and the projection module 10 is disposed on a side of the housing 15. The housing 15 is connected to the base 17 through the frame 16. The base 17 is on the bearing surface 100. That is, the projection module 10, the first camera module 11 and the second camera module 12 are disposed above the base 17. In this embodiment, the projection module 10 is spaced from the bearing surface 100 bearing the projection device 1 for a first distance Z1, the first camera module 11 is spaced from the bearing surface 100 for a second distance Z2, and the second camera module 12 is spaced from the bearing surface 100 for a third distance Z3. The first distance Z1, the second distance Z2 and the third distance Z3 ranges from 350 mm to 450 mm. In this embodiment, the projection module 10, the first camera module 11 and the second camera module 12 are located on the same reference plane RP. That is, the height (the first distance Z1) of the projection module 10 with respect to the bearing surface 100, the height (the second distance Z2) of the first camera module 11 with respect to the bearing surface 100 and the height (the third distance Z3) of the second camera module 12 with respect to the bearing surface 100 are equal. However, the invention is not limited thereto. In another embodiment, the first distance Z1, the second distance Z2 and the third distance Z3 are unequal. In addition, the projection module 10 is spaced from the first camera module 11 for a first gap D1. In this embodiment, the first gap D1 ranges from 160 mm to 170 mm. The projection module 10 is spaced from the second camera module 12 for a second gap D2. In this embodiment, the second gap D2 ranges from 110 mm to 120 mm. However, the invention is not limited thereto. In another embodiment, the first gap D1 between the projection module 10 and the first camera module 11 ranges from 110 mm to 120 mm, and the second gap D2 between the projection module 10 and the second camera module 12 ranges from 160 mm to 170 mm. In addition, in this embodiment, the second shooting area CA2 formed on the bearing surface 100 by the second camera module 12 is quadrilateral which has a long side X1 near the second shooting area CA2.

As shown in FIGS. 4 and 5, the projection device 1 of this embodiment further includes a baseline L perpendicular to the reference plane RP. In this embodiment, the first optical axis AX1 of the projection module 10 is parallel to the baseline L. The second optical axis AX2 of the first camera module 11 forms a first angle Δθ1 with respect to the baseline L. The first angle Δθ1 ranges from 3 degree to 5 degree. The third optical axis AX3 of the second camera module 12 forms a second angle Δθ2 with respect to the baseline L. The second angle Δθ2 ranges from 3 degree to 5 degree. That is, the projection direction of the projection module 10 is maintained, but the shooting direction of the first camera module 11 is shifted for 3 degrees to 5 degrees with respect to the projection direction of the projection module 10 to allow the projection area PA, the first shooting area CA1 and the second shooting area CA2 to at least partially overlap one another to form the overlapping area OA'. In addition, the projection module 10 of this embodiment has a view angle θ1 ranging from 60 degree to 70 degree. The first camera module 11 has a view angle θF2 ranging from 60 degree to 75 degree. The second camera module 12 has a view angle θF3 ranging from 65 degree to 75 degree.

In this embodiment, the first angle 401 between the second optical axis AX2 of the first camera module 11 and the first optical axis AX1 of the projection module 10 is equal to the second angle Δθ2 between the third optical axis AX3 of the second camera module 12 and the first optical axis AX1 of the projection module 10. However, the invention is not limited thereto. In another embodiment, the first angle Δθ1 and the second angle Δθ2 are different.

Particularly, since the first optical axis AX1 of the projection module 10 is parallel to the baseline L, the first angle Δθ1 is the angle between the second optical axis AX2 of the first camera module 11 and the first optical axis AX1 of the projection module 10, and the second angle Δθ2 is the angle between the third optical axis AX3 of the second camera module 12 and the first optical axis AX1 of the projection module 10. In this embodiment, the first angle Δθ1 is a function of the distance (the first gap D1) between the projection module 10 and the first camera module 11. When the projection area PA of the projection module 10 is entirely included in the first shooting area CA1 of the first camera module 11, $\Delta\theta1=f(D1)=\arctan((D1+X)/Z2)-\arctan(X/Z2)$. The second angle Δθ2 is a function of the distance (the second gap D2) between the projection module 10 and the second camera module 12. When the projection area PA of the projection module 10 is entirely included in the second shooting area CA2 of the first camera module 12, $$\Delta\theta2=f(D2)=\arctan((D2+X1)/Z3)-\arctan(X1/Z3).$$

Figure 6:
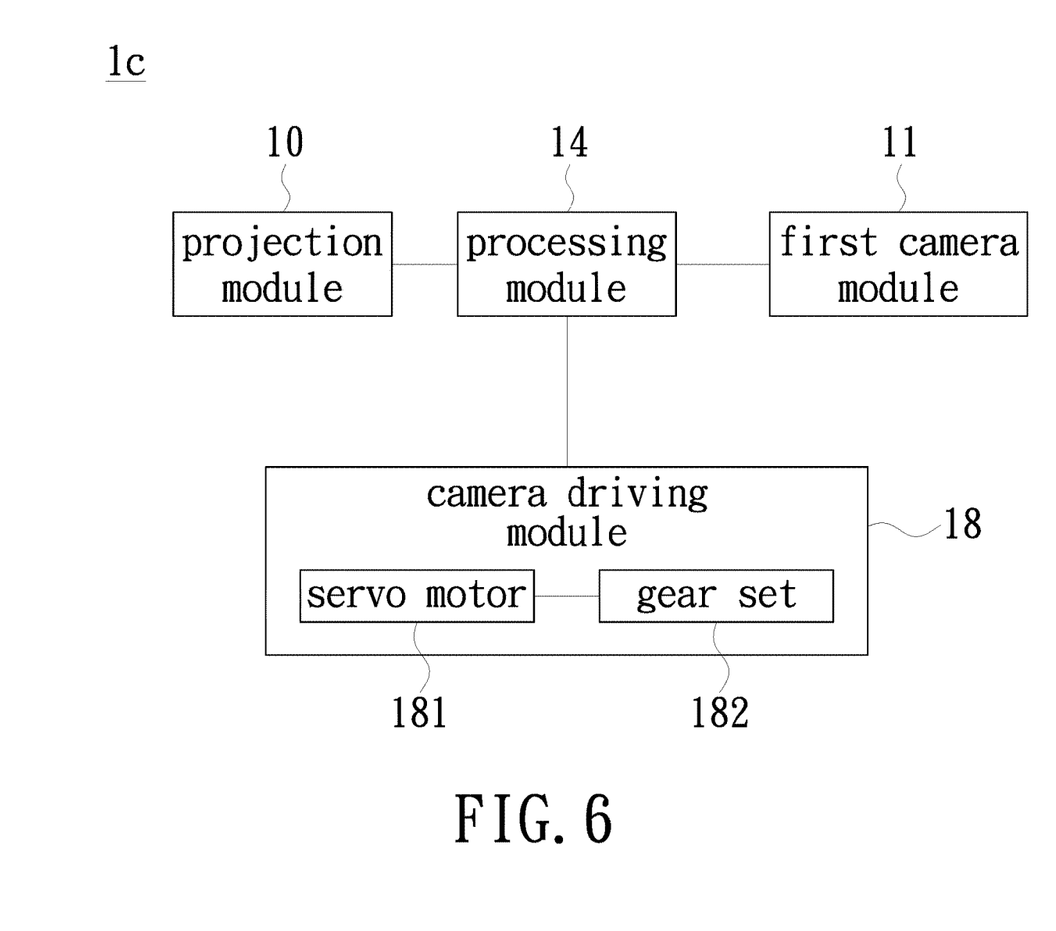
FIG. 6 is a block diagram of another embodiment of a projection device of the present invention.

Referring to FIG. 6. FIG. 6 is a block diagram of another embodiment of a projection device of the present invention. As shown in FIG. 6, the projection device 1c of this embodiment is similar to the projection device 1 of FIG. 1. However, the projection device 1c of this embodiment further includes a processing module 14 electrically connected to the projection module 10 and the first camera module 11. The processing module 14 is configured to enable the projection module 10 and the first camera module 11. For example, the projection module 10 projects image to the bearing surface 100 according to the image signals provided by the processing module 14. When a user operates with a gesture or touch control, the processing module 14 controls the projection module 10 to project another image according to the image captured by the first camera module 11.

As shown in FIG. 6, the projection device 1c further includes a camera driving module 18 electrically connected to the processing module 14. When the projection module 10 rotates to an angle and is enabled on the Y-Z plane (for example, the plane perpendicular to the bearing surface 100 or the plane not parallel to bearing surface 100), the processing module 14 enables the camera driving module 18 to drive the first camera module 11 to rotate to a specific angle on the Y-Z plane (for example, the first angle Δθ1 of the aforementioned embodiments). In addition, the camera driving module 18 includes at least one servo motor 181 and at least one gear set 182. When the camera driving module 18 is enabled, the servo motor 181 rotates the gear set 182 so as to rotate the first camera 11 to a corresponding angle on the X-Y plane.

Figure 7:
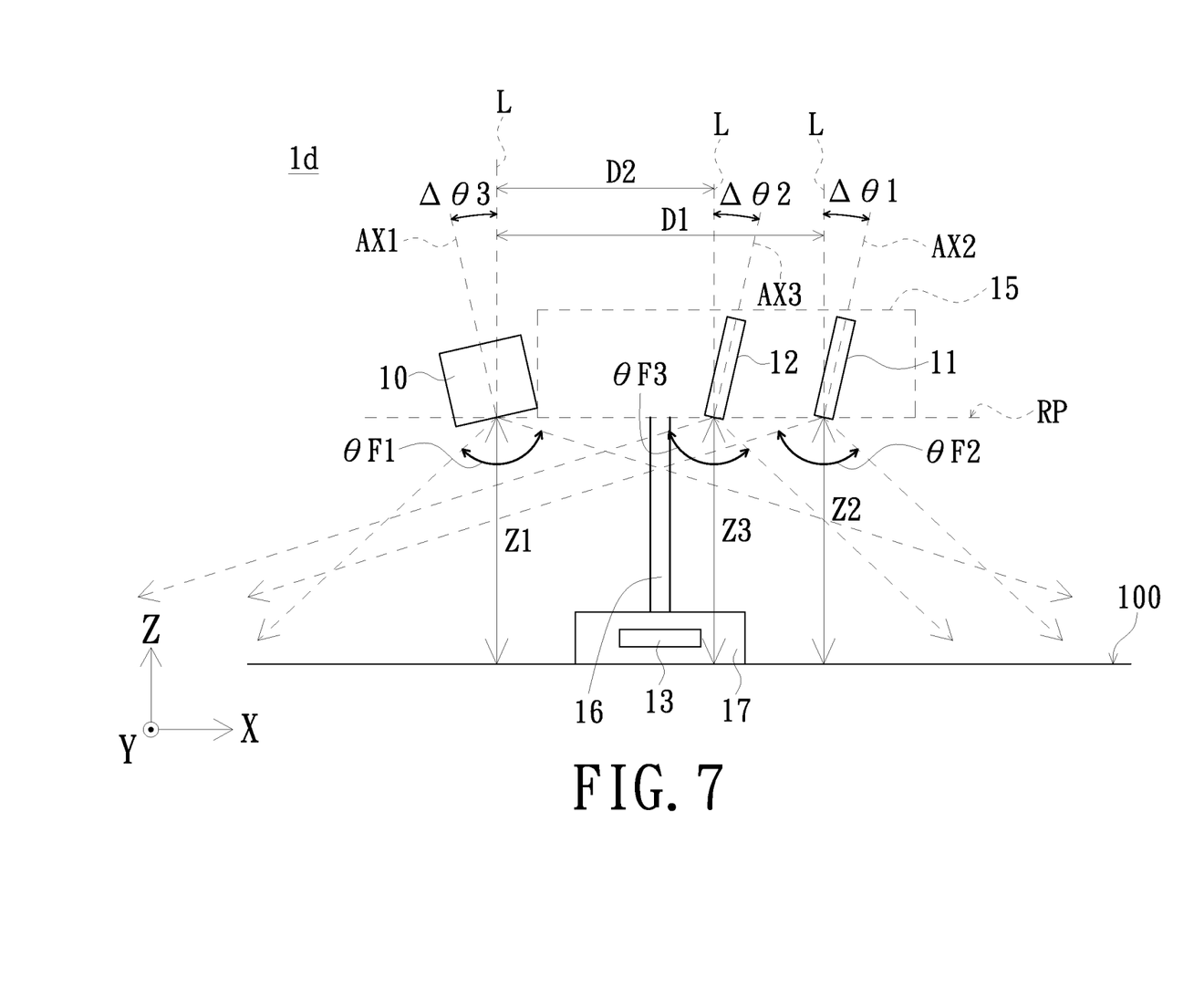
FIG. 7 is a schematic diagram of another embodiment of a projection device of the present invention.

Referring to FIG. 7. FIG. 7 is a schematic diagram of another embodiment of a projection device of the present invention. As shown in FIG. 7, the projection device 1d is similar to the projection device 1b of FIG. 4. However, the first optical axis AX1 of the projection module 10 of the projection device 1d forms a third angle Δθ3 with respect to the baseline L. In this embodiment, the third angle Δθ3 between the first optical axis AX1 of the projection module 10 and the baseline L ranges from 0 degree to 30 degree. When the projection direction, the shooting direction of the first camera module 11 and the shooting direction of the second camera module 12 are inclined simultaneously, the overlapping area formed by the projection area of the projection module 10, the first shooting area of the first camera module 11 and the second shooting area of the second camera module 12 is effectively increased. Other structures of the projection device 1d are similar to that of the projection device 1b of FIG. 4, and the description for them is thus omitted. In addition, the projection area of the projection module 10, the first shooting area of the first camera module 11, the second shooting area of the second camera module 12 and the overlapping area formed by the projection area at least partially overlapping the first shooting area and the second shooting area are similar to that of FIG. 5, and the description for them is thus omitted.

Figure 8:
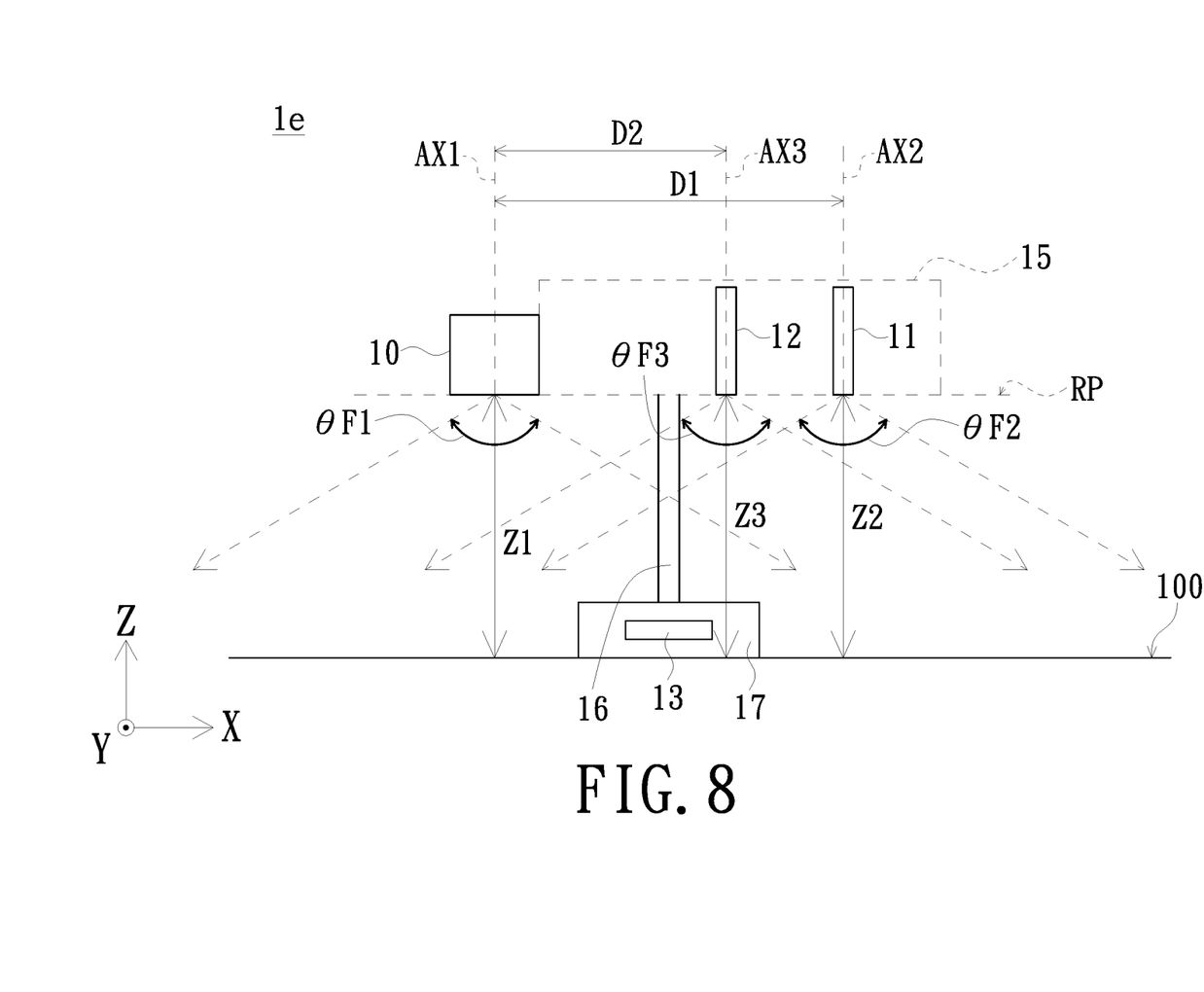
FIG. 8 is a schematic diagram of another embodiment of a projection device of the present invention.
Figure 9:
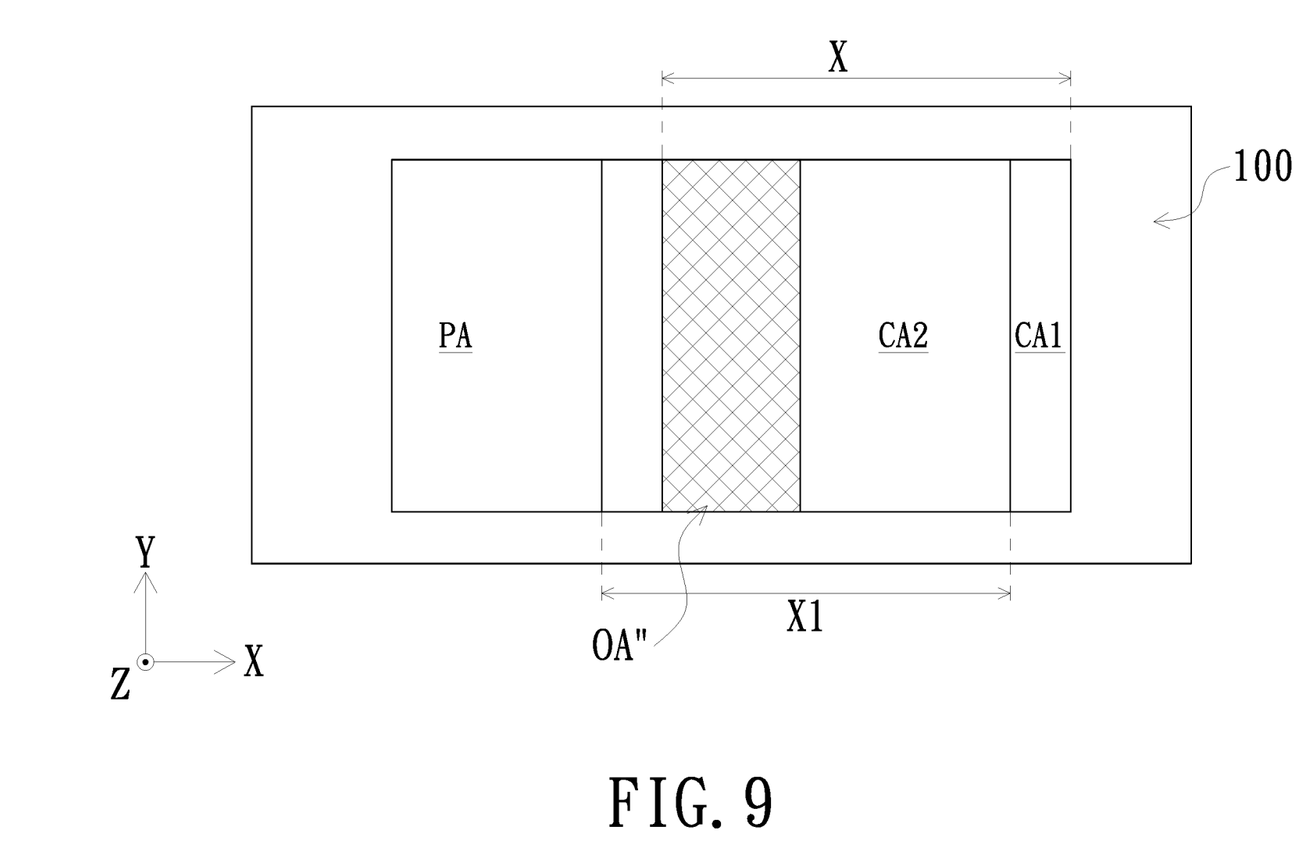
FIG. 9 is a schematic diagram of a projection area of a projection module, a shooting area of the first camera module and a shooting area of the second camera module of the projection device of FIG. 8.

Referring to FIGS. 8 and 9. FIG. 8 is a schematic diagram of another embodiment of a projection device of the present invention, and FIG. 9 is a schematic diagram of a projection area of a projection module, a shooting area of the first camera module and a shooting area of the second camera module of the projection device of FIG. 8. As shown in FIGS. 8 and 9, the projection device 1e is similar to the projection device 1b of FIG. 4. However, the projection device 1e of this embodiment, projection module 10, the first camera module 11 and the second camera module 12 are located on the same reference plane RP. The first optical axis AX1, the second optical axis AX2 and the third optical axis AX3 are perpendicular to the reference plane RP. In this embodiment, the first optical axis AX1 of the projection module 10, the second optical axis AX2 of the first camera module 11 and the third optical axis AX3 of the second camera module 12 are perpendicular to the reference plane RP. In such a structure, the projection area PA of the projection module 10, the projection area PA of the projection module 10, the first shooting area CA1 of the first camera module 11 and the second shooting area CA2 of the second camera module 12 at least partially overlap one another to form an overlapping area OA" which is substantially quadrilateral. In this embodiment, the projection module 10 has a projection element with smaller view angle so as to form a smaller projection area PA and increase the overlapping area OA" formed by the projection area PA of the projection module 10, the projection area PA of the projection module 10, the first shooting area CA1 of the first camera module 11 and the second shooting area CA2 of the second camera module 12.

Figure 10:
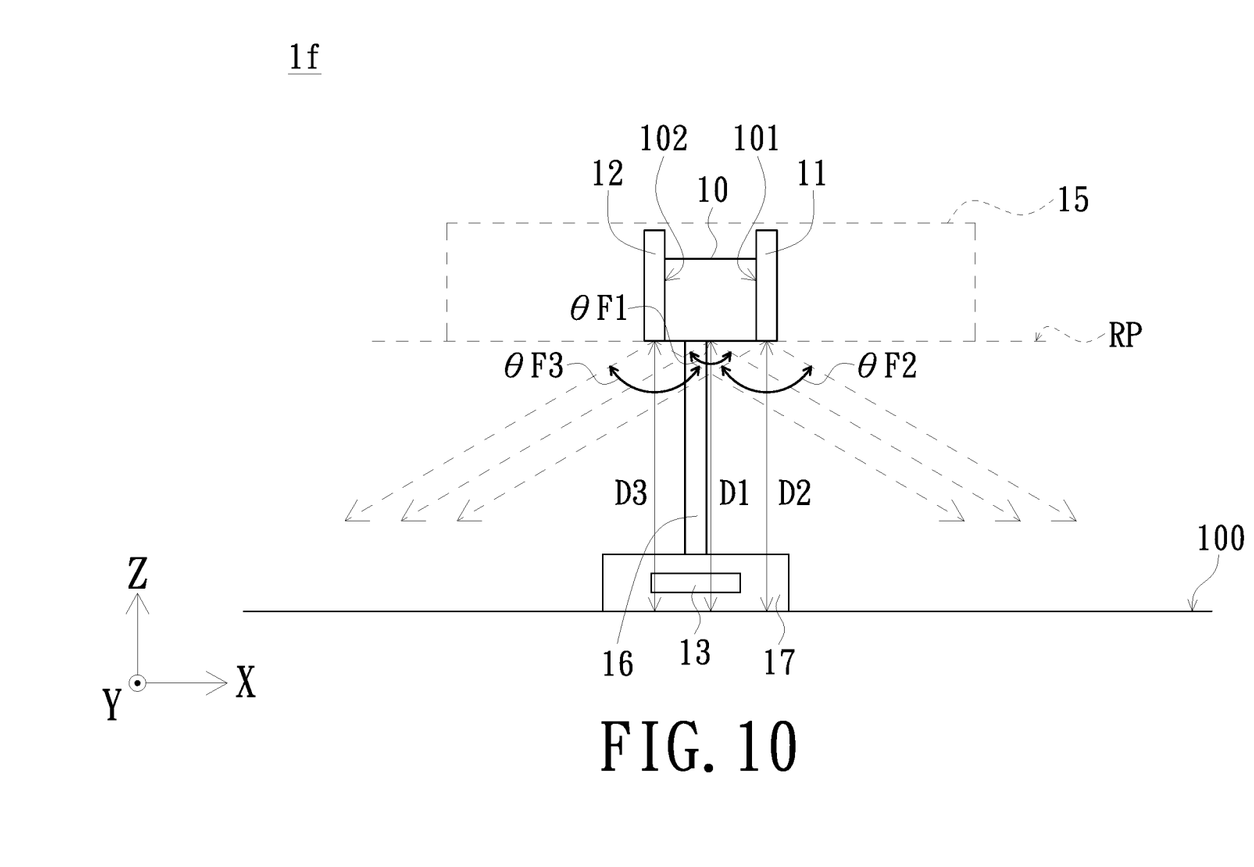
FIG. 10 is a schematic diagram of another embodiment of a projection device of the present invention.
Figure 11:
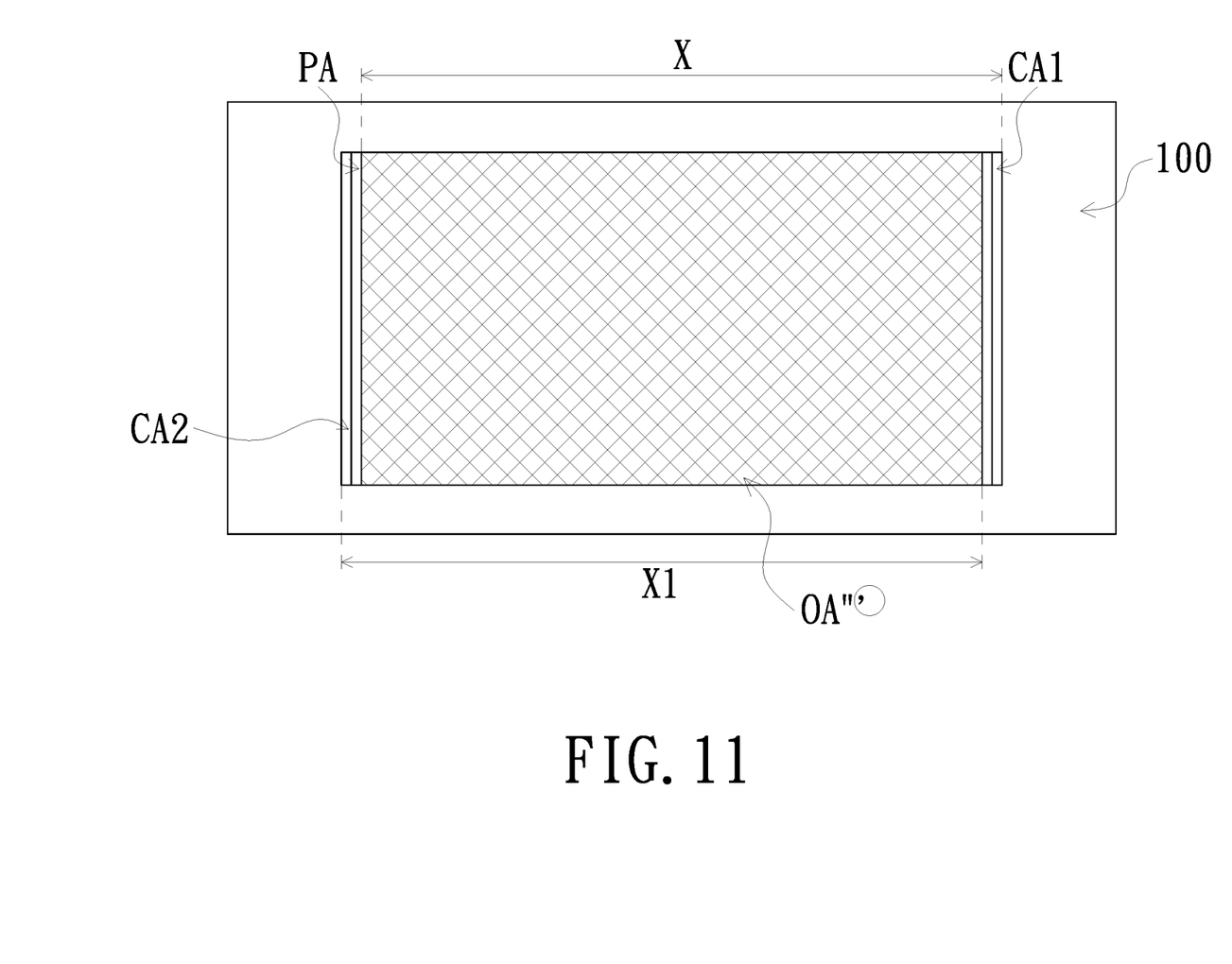
FIG. 11 is a schematic diagram of a projection area of a projection module, a shooting area of the first camera module and a shooting area of the second camera module of the projection device of FIG. 10.

Referring to FIGS. 10 and 11. FIG. 10 is a schematic diagram of another embodiment of a projection device of the present invention, and FIG. 11 is a schematic diagram of a projection area of a projection module, a shooting area of the first camera module and a shooting area of the second camera module of the projection device of FIG. 10. As shown in FIGS. 10 and 11, the projection device 1f is similar to the projection device 1e of FIG. 8. However, the first camera module 11 of the projection device 1f of this embodiment is connected to a first side 101 of the projection module 10, and the second camera module 12 is connected to a second side 102 of the projection module 10. That is no gap is formed between the first camera module 11 and the projection module 10, and no gap is formed between the second camera module 12 and the projection module 10. In such a structure, the projection area PA of the projection module 10, the projection area PA of the projection module 10, the first shooting area CA1 of the first camera module 11 and the second shooting area CA2 of the second camera module 12 at least partially overlap one another to form an overlapping area OA''' which is substantially quadrilateral.

In the structure of the projection device of the present invention, the second optical axis of the first camera module and the third optical axis of the second camera module are inclined with respect to the first optical axis of the projection module to enlarge the overlapping area formed by the projection area, the first shooting area and the second shooting area so as to improve operational performance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection device, comprising:
a projection module comprising a first optical axis, projecting an image to a bearing surface bearing the projection device and configured to form a projection area, wherein a projection of the first optical axis on an X-Z plane of the projection device is perpendicular to an X-Y plane on which the projection area is formed;
a first camera module disposed on a side of the projection module and comprising a second optical axis, wherein the first camera module is configured to form a first shooting area, the second optical axis forms a first angle Δθ1 with respect to the first optical axis, the projection area at least partially overlaps the first shooting area to form an overlapping area, and the first angle Δθ1 is a function of a distance between the projection module and the first camera module; and
a base, disposed on the bearing surface, wherein the projection module and the first camera module are disposed on a side of the base, the bearing surface has a first distance Z1 to the projection module and a second distance Z2 to the first camera module, a first gap D1 is formed between the projection module and the first camera module, the first camera module shoots towards the bearing surface to form the first shooting area on the bearing surface when Δθ1=0, the first shooting area is quadrilateral and comprises two long sides and two wide sides, and a length of the long side near the base is 2X, wherein a value of the first angle Δθ1 is the function of the distance between the projection module and the first camera module, and Δθ1=f(D1)=arctan((D1+X)/Z2)−arctan(X/Z2) when the projection area of the projection module is entirely included in the first shooting area.

2. The projection device according to claim 1, further comprising a reference plane, wherein the projection module and the first camera module are disposed on the reference plane.

3. The projection device according to claim 2, further comprising a baseline perpendicular to the reference plane, wherein the first optical axis of the projection module is parallel to the baseline, and the second optical axis of the first camera module forms the first angle $\Delta\theta1$ with respect to the baseline.

4. The projection device according to claim 1, wherein the first camera module is a color camera module.

5. The projection device according to claim 1, further comprising a light emitting module configured to form a sensing area, wherein the first camera module shoots movements of a user occurring in the sensing area, and the first shooting area covers the sensing area.

6. The projection device according to claim 5, wherein the first camera module is an infrared camera module, and the light emitting module is an infrared emitting module.

7. The projection device according to claim 1, further comprising a processing module electrically connected to the projection module and the first camera module, wherein the processing module is configured to enable the projection module and the first camera module.

8. The projection device according to claim 7, further comprising a camera driving module electrically connected to the processing module, wherein the processing module enables the camera driving module to drive the first camera module to rotate to a specific angle on a Y-Z plane when the projection module rotates to the specific angle on the Y-Z plane.

9. The projection device according to claim 8, wherein the camera driving module comprises at least one servo motor and a gear set.

10. The projection device according to claim 1, further comprising:
   a second camera module disposed between the projection module and the first camera module, wherein the second camera module comprises a third optical axis and is configured to form a second shooting area, the third optical axis forms a second angle $\Delta\theta2$ with respect to the first optical axis, and the second shooting area, the first shooting area and the projection area at least partially overlap one another to form the overlapping area; and
   a light emitting module configured to form a sensing area, wherein the second camera module is configured to shoot movements of a user occurring in the sensing area, and the second shooting area covers the sensing area.

11. The projection device according to claim 10, wherein the projection module projects an image to a bearing surface bearing the projection device to form the projection area, the projection device further comprises a base on the bearing surface, the projection module and the first camera module are disposed on a sides of the base, the bearing surface has a first distance Z1 to the projection module, a second distance Z2 to the first camera module, the second camera module has a third distance Z3 to the bearing surface, a first gap D1 is formed between the projection module and the first camera module, a second gap D2 is formed between the projection module and the second camera module, and the second camera module shoots towards the bearing surface to form the second shooting area on the bearing surface when the second angle $\Delta\theta2=0$, the second shooting area is quadrilateral and comprises two long sides and two wide sides, and a length of the long side near the base is 2X1.

12. The projection device according to claim 11, further comprising a reference plane, wherein the projection module, the first camera module and the second camera module are disposed on the reference plane.

13. The projection device according to claim 12, further comprising a baseline perpendicular to the reference plane, wherein the second optical axis of the first camera module forms the first angle $\Delta\theta1$ with respect to the baseline, the third optical axis of the second camera module forms the second angle $\Delta\theta2$ with respect to the baseline, and the first optical axis of the projection module forms a third angle $\Delta\theta3$ with respect to the baseline, when the projection area of the projection module is entirely included in the first shooting area which is quadrilateral and comprises two long sides and two wide sides, and a length of the long side near the base is 2X, a value of the first angle $\Delta\theta1=f(D1)=\arctan((D1+X)/Z2)-\arctan(X/Z2)$, and when the projection area of the projection module is entirely included in the second shooting area, a value of the second angle $\Delta\theta2=f(D2)=\arctan((D2+X1)/Z3)-\arctan(X1/Z3)$, and the third angle ranges from 0 degree to 30 degrees.

14. The projection device according to claim 10, wherein the first camera module is a color camera module, the second camera module is an infrared camera module, and the light emitting module is an infrared emitting module.

15. A projection device, comprising:
   a projection module comprising a first optical axis and configured to form a projection area;
   a first camera module disposed on a first side of the projection module and comprising a second optical axis, wherein the first camera module and the projection module are disposed on a reference plane, and the first optical axis and the second optical axis are perpendicular to the reference plane, the first camera module is configured to form a first shooting area, and the projection area at least partially overlaps the first shooting area to form an overlapping area; and
   a second camera module disposed on a second side opposite to the first side of the projection module and on the reference plane, wherein the second camera module comprises a third optical axis and is configured to form a second shooting area, the third optical axis is perpendicular to the reference plane, the projection area, the first shooting area and the second shooting area at least partially overlap one another to form the overlapping area.

16. The projection device according to claim 15, further comprising:
   a light emitting module configured to form a sensing area, wherein the second camera module is configured to shoot movements of a user occurring in the sensing area, and the second shooting area covers the sensing area.

17. The projection device according to claim 15, wherein the first camera module is connected to the first side of the projection module, and the second camera module is connected to the second side of the projection module.

18. The projection device according to claim 16, wherein the first camera module is a color camera module, the second camera module is an infrared camera module, and the light emitting module is an infrared emitting module.

* * * * *